United States Patent [19]

Ivanov et al.

[11] 4,415,538

[45] Nov. 15, 1983

[54] APPARATUS FOR CHLORINATION OF MOLTEN MAGNESIUM CHLORIDE SALTS

[76] Inventors: Andrei B. Ivanov, prospekt Smirnova, 59, kv. 151; Vladimir I. Schegolev, ulitsa Korablestroitelei, 29, korpus 4, kv. 252, both of Leningrad; Viktor A. Rudakov, ulitsa Pushkina, 15, kv. 48, Ivano-Frankovskaya oblast, Kalush; Sergei P. Kosarev, Nalichnaya ulitsa, 39, korpus 1, kv. 20; Elizaveta A. Grigorieva, ulitsa 3 Internatsionala, 68, kv. 53, both of Leningrad; Alexandr T. Podanenko, ulitsa B. Khmelnitskogo, 48, kv. 69, Ivano-Frankovskaya oblast, Kalush; Oleg N. Romanenko, prospekt Lenina, 6, kv. 46, Ivano-Frankovskaya oblast, Kalush; Leonid P. Stavrov, ulitsa 50-letia VLKSM, 8, kv. 84, Ivano-Frankovskaya oblast, Kalush; Anatoly B. Kondratenko, ulitsa V. Tereshkovoi, 15, Ivano-Frankovskaya oblast, Kalush; Konstantin D. Muzhzhavlev, ulitsa Zheleznovodskaya, 48, kv. 30, Leningrad; Vladimir G. Ovcharenko, prospekt Lenina, 7"a", kv. 9, Ivano-Frankovskaya oblast, Kalush; Grigory P. Khristjuk, ulitsa Karpinskogo, 16, kv. 219, Leningrad; Alexei V. Vasiliev, ulitsa B.Khmelnitskogo, 66, kv. 57, Ivano-Frankovskaya oblast, Kalush; Anatoly L. Garkavy, ulitsa 40-letia Oktyabrya, 49, kv. 52, Ivano-Frankovskaya oblast, Kalush, all of U.S.S.R.; Ivan G. Gachegov, deceased, late of Ivano-Frankovskaya oblast, Kalush, U.S.S.R.; Lidia T. Gachegova, administrator, ulitsa B.Khmelnitskogo, 66, kv. 61, Ivano-Frankovskaya oblast, Kalush, U.S.S.R.

[21] Appl. No.: 251,173

[22] Filed: Apr. 6, 1981

[51] Int. Cl.$^3$ .............................................. B01F 13/02
[52] U.S. Cl. ..................................... 422/224; 75/112; 261/123; 266/218; 366/336
[58] Field of Search ............... 422/135, 199, 224, 241, 422/228; 75/112; 261/79 A, 123; 366/336, 340; 423/178, 497; 266/217-219

[56] References Cited

U.S. PATENT DOCUMENTS

| | | | |
|---|---|---|---|
| 2,055,836 | 9/1936 | Cowles | 366/336 X |
| 2,591,700 | 4/1952 | Jacolev et al. | 422/224 X |
| 2,806,768 | 9/1957 | Bender et al. | 422/224 |
| 3,101,249 | 8/1963 | Priscu | 422/224 X |
| 4,191,480 | 3/1980 | Hiorth | 366/336 |
| 4,279,627 | 7/1981 | Paul et al. | 261/79 A X |

FOREIGN PATENT DOCUMENTS

| | | | |
|---|---|---|---|
| 578392 | 6/1959 | Canada | 422/224 |
| 1478864 | 7/1977 | United Kingdom | 422/224 |
| 532391 | 4/1977 | U.S.S.R. | |

OTHER PUBLICATIONS

Ivanov et al; "Production of Magnesium by Electrolysis"; State Scientific-Technical Publishing House for Literature on Ferrous and Non-Ferrous Metallurgy; Moscow, 1962; p. 79.

*Primary Examiner*—Richard L. Chiesa
*Attorney, Agent, or Firm*—Steinberg & Rasin

[57] ABSTRACT

Disclosed is an apparatus for chlorination of molten magnesium chloride salts, comprising a shell lined with a refractory material and having the interior thereof formed by walls, a bottom and a cover. The lower portion of the shell walls is provided with chlorine inlet means whereas the upper one has a melt feed inlet means and a chlorinated melt outlet means. The interior of the shell is so tapered downward that its clear opening at the level of the chlorine inlet means is not over 0.3 times that at the level of the melt feed inlet means and the chlorinated melt outlet means.

2 Claims, 3 Drawing Figures

APPARATUS FOR CHLORINATION OF MOLTEN MAGNESIUM CHLORIDE SALTS

FIELD OF THE INVENTION

The present invention relates to electrolytic magnesium and chlorine production, and more particularly, to apparatus for chlorination of molten magnesium chloride salts.

The invention can be most advantageously used in furnaces designed for chlorination of magnesium chloride hydrolysis products in a melt of chloride salts having a composition close to that of the carnallite.

BACKGROUND OF THE INVENTION

It is well known to those skilled in designing new apparatus for chlorination of molten salts that ever increasing requirements are placed upon elements of the apparatus. First, the elements are to provide a uniform chlorine distirbution in the melt along the chlorine path and a complete chlorine utilization. Second, the apparatus elements should be simple in production and reliable in service under aggressive media conditions. These requirements are not so far met adequately in any one of the known apparatus.

In particular, known in the prior art is a chlorination apparatus (see Streletz, H. L. "Magnesium production by electrolysis", "Metallurgizdat", 1962, p.79) comprising a rectangular shell lined with a refractory material and formed by walls, a bottom and a cover. Electrodes and a gaseous product outlet means are introduced into the shell through the cover. The shell walls are provided with chlorine inlet means, a melt feed inlet means and a chlorinated melt outlet means.

In the known prior art apparatus, the chlorination space is composed of a plurality of chlorination zones separated by partitions and horizontal grates. Molten salts are chlorinated by an interaction of the melt flow fed to the upper portion of the apparatus interior and the chlorine gas forced by a pressure into the lower portion of the apparatus under the grates.

However, such apparatus have complicated constructions and are insufficiently efficient in operation.

Note also that in this device the chlorination process goes on actively only in the vicinity of chlorine inlet means. Dead (stagnation) zones are always formed in the lower portion of the apparatus interior, where the melt does not contact the chlorine, whereby insoluble suspensions are settled, this followed by formation of viscous slurry hereinafter called sludge which should be intermittently removed.

Furthermore, in the known prior art apparatus, the gas distribution grates are made as ceramic plates mounted into the lining on the periphery and having shaped holes for chlorine passage over the entire area.

The gas distribution grates considerably limit the time of continuous operation of the apparatus because of emergency conditions which occur frequently. First, they take place since certain holes in the gas distribution grates are clogged up with the sludge and lining crumbs during the operation. As a result, the chlorine contact with the melt is disturbed. Second, the gas distribution grates are quickly destroyed by hydraulic impacts and vibrations.

In Great Britain Pat. No. 1,478,864 "Process and Apparatus for Producing Anhydrous Magnesium Chloride", packing of lumps of carbonaceous material uniformly distributed over the entire volume of the chlorination tower are used as gas distribution grates. However, carbonaceous material packing is ultimately overgrown with sludge, necessitating a periodical repair of the chlorination tower and replacement of the packing.

In the patent mentioned hereinabove the construction of the chlorination tower is such that the melt of magnesium chloride salts is pumped through heated pipes to the top of rectangular shell of the chlorination tower packed with a bed of carbonaceous material lumps. At the same time chlorine and oxygen are supplied through a heated pipe to the tower base and fed, in counter-current flow with the melt flowing downward, through the chlorine inlet means.

The height of the chlorination tower is considerably increased as compared with that of the apparatus discussed hereinabove, thus providing contact between the chlorine and the melt for a longer period of time. However, the chlorine and melt flows may separate owing to the non-uniform sludge settling to the beds of carbonaceous material.

Furthermore, the pump used to produce the melt flow through the chlorination tower and special means employed for recycling the melt extremely complicate the construction of the chlorination apparatus.

It is also important that the operation of the apparatus is hampered by the fact that it is necessary to remove periodcally the sludge from its chlorination tower, and this, in turn, requires a high labour consumption and additional expenditures.

Also known (cf. USSR Author's Certificate No. 532391) is an apparatus for chlorination of molten magnesium chloride salts, comprising a conical shell lined with a refractory material with a lid, electrodes, a gas distribution grate, chlorine inlet means, a melt feed inlet connection and a chlorinated melt outlet connection. The gas distribution grate is made of beams arranged horizontally one above the other, the longitudinal axes of the beams being displaced with respect to each other. The chlorine inlet means are mounted in the shell walls below the grate in the most narrow, lower portion of the apparatus.

In this construction the contact surface of the chlorine and melt is increased due to the downward tapering of the apparatus interior and, as a result, due to sufficiently high speeds of the gas and the melt in the lower portion of the apparatus as the chlorine is introduced.

Such an apparatus has a considerably simpler construction and a longer service life than the prior art apparatus intended for similar applications. In particular, the design of the grate is more simple.

However, such a construction can be used only in apparatus of a small capacity up to 6 tons, since any increase in the apparatus diameter would lead to disturbances in the uniform chlorine distribution in the melt bulk, to an excessive increase in mechanical loads acting on construction elements, and to a decrease in reliability of fastening the beams forming the grate.

It is important to note that an attempt was made to overcome difficulties arising in course of apparatus operation owing to the use of gas distribution grates by changing their construction and this attempt led to negligible results. Grates made of beams are more stable to mechanical loads and especially simpler in construction, but the grate utilization itself hinders the melt in the entire volume of apparatus chlorination space to be involved into the melt circulation. As a result, the sludge is also settled on the bottom of the apparatus.

Thus, the known apparatus for chlorination of molten magnesium chloride salts fails to provide an adequately complete contact of the melt and the chlorine and, as a result, do not prevent sludge accumulation on the bottom of the apparatus.

Because of an ever increasing demand for magnesium and chlorine a problem arose to improve essentially the apparatus for chlorination of molten salts so as to meet growing requirements of their higher production rate, longer life and lower chlorine consumption.

SUMMARY OF THE INVENTION

It is an object of the present invention to provide an apparatus for chlorination of molten salts with a higher production rate as compared with that of the prior art apparatus in a continuous operation.

Another object of the invention is to provide an apparatus for chlorination of molten salts with lower chlorine losses in operation.

A further object of the invention is to provide an apparatus for chlorination of molten salts with a capacity that can be increased without any restrictions, the high performance being maintained during apparatus operation.

A still further object of the invention is to provide an apparatus for chlorination of molten salts, having such a construction that prevents accumulation of the sludge on the bottom and eliminates the operation of its removal.

With these and other objects in view, there is proposed an apparatus for chlorination of molten magnesium chloride salts, comprising a shell lined with a refractory material and having walls, a bottom and a cover, a melt feed inlet means and a chlorinated melt outlet means being mounted in the upper portions of the shell walls whereas chlorine inlet means used to supply the chlorine into the shell interior being installed in the lower portion thereof, wherein, according to the invention, the shell interior is tapered downward in such a manner that its clear opening at the height of the chlorine inlet means is not over 0.3 times that of said shell interior at the height of the melt inlet and outlet means.

It was found during an experimental industrial production process that this is the shell interior clear-opening ratio for the salt chlorination apparatus which provides a uniform chlorine distribution over the entire melt bulk and, hence, its more effective utilization as related to chlorination of impurities, thus considerably increasing in combination the production rate of the apparatus.

In accordance with another embodiment of the invention, the apparatus can incorporate in the shell interior, at least one partition mounted in the bottom, tapering upward and dividing the shell interior into chambers tapering downward and open at the top, the chlorine inlet means being arranged on both sides of the partition. It is advisable that the height of the partition tapering upward should exceed the distance from the bottom to the chloride inlet means by a factor of at least two. It is also important that the partition should form chambers, each supplied with chlorine separately.

The wedge-shaped partition tapering upward and installed on the bottom increases the speed of chlorine and melt circulation and, hence, the apparatus production rate. The partition of said height installed in the communicating chambers formed in the lower portion of the shell interior facilitates an intensive stirring of the melt and the chlorine in the entire volume of each chamber, preventing sludge settling on the bottom and, hence, providing a more active chlorination of impurities.

It is advisable to install more than one partition in apparatus of high capacity.

According to still another embodiment of the invention in the shell interior there are provided two mutually intersecting partitions installed in the bottom and tapering upward, one arranged along the longitudinal axis of the apparatus and another disposed along the transverse axis of the apparatus, the chlorine inlet means being located on both sides of one of the partitions.

Two intersecting partitions forming four chambers tapering downward simplify the construction of an apparatus of high capacity and provide the convenient operation thereof.

It is advisable that the distance from the bottom to the chlorine inlet devices should be less than 0.1 times that from the bottom to the melt feed inlet means and the chlorinated melt outlet means.

The chlorine inlet means installed at such a height from the bottom prevent sludge collection on the bottom and, thus, eliminate the labour-consuming operation of forced sludge removal from the apparatus, and ultimately increase the continuous-operation time of the apparatus.

BRIEF DESCRIPTION OF THE DRAWINGS

These and other objects and advantages of the present invention will become fully apparent from the following description taken in conjunction with the accompanying drawings, wherein.

It should be noted that the accompanying drawings are made schematically and are merely exemplary and do not impose any restrictions on the dimensions of elements and parts thereof.

DETAILED DESCRIPTION OF THE EMBODIMENTS

Figure 1:
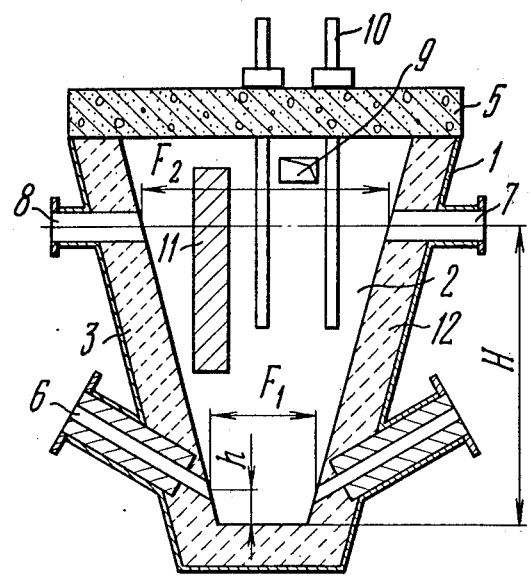
FIG. 1 is a vertical sectional view of an apparatus for chlorination of molten magnesium chloride salts.

Referring now to the accompanying drawings and initially to FIG. 1, the apparatus for chlorination of molten magnesium chloride salts according to the invention comprises a shell 1 lined with a refractory material and having an interior 2 formed by walls 3, a bottom 4 and a cover 5. Mounted symmetrically in the lower portion of the walls 3 of the shell 1 are chlorine inlet means 6 used to supply chlorine into the interior 2 of the shell 1, that are a system of branch pipes. Melt feed inlet means 7 and chlorinated melt outlet means 8 are installed in the upper portion of the walls 3 of the shell 1. The melt feed inlet means 7 is a branch pipe mounted in the wall 3 of the shell 1 and providing the communication between the melting chamber (not shown) and the interior 2 of the apparatus. Similarly, mounted in the opposite wall 3 of the shell 1 is the chlorinated melt outlet means 8 that is a branch pipe providing the communication between the interior 2 of the apparatus and a sediment chamber (not shown).

One of the walls 3 of the shell 1 is provided with an opening 9 used to remove gaseous products. Inserted through the cover 5 into the interior 2 of the shell 1 are at least two heating electrodes 10. Furthermore, arranged in the interior 2 is a partition 11 supported by the walls and disposed in the upper portion of this interior so that it divides the latter into two parts at the height of the melt inlet and outlet means 7 and 8, the melt feed inlet means 7 being located on one side of the partition whereas the chlorinated melt outlet means 8 being disposed on the other side.

The shell 1 tapers downward and is lined inside with a refractory material 12. The inclination of the walls 3 may be uniform throughout the length as shown in FIG. 1 or the walls 3 of the shell 1 may be inclined only in the lower portion, viz., from the bottom to the level exceeding the height of arrangement of the chlorine inlet means by a factor of two.

The clear opening, $F_1$, of the interior 2 of the shell 1 at the height of the chlorine inlet means 6 is not over 0.3 of the clear opening, $F_2$, at the height of the melt inlet and outlet means 7 and 8. This ratio of the clear openings $F_1$ and $F_2$ was found by the applicants in experiments and in an experimental industrial production process that provided an activized chlorination process not only in the vicinity of the chlorine supply branch pipes, but in the entire volume of the apparatus interior, opening the way for an unrestricted increase in the apparatus capacity.

The optimal degree of tapering of the interior 2 of the apparatus provided an increase in the contact surface of the chlorine and the melt due to an increase in speeds of the gas and the melt in the vicinity of chlorine inlet means 6.

A higher ratio of the clear openings $F_1$ and $F_2$ of the interior 2 would increase the probability of sludge settling onto the bottom 4 and an inefficient utilization of the chlorine.

According to another embodiment of the invention, the interior 2 (FIG. 2) accommodates a wedge-shaped partition 13 tapering upward and mounted in the bottom 4, the wedge-shaped partition 13 dividing the lower portion of the interior 2 of the shell 1 into two chambers 14 tapering downward and open at the top.

In this embodiment, the chambers 14 are two zones of an intensive stirring of the chlorine and the melt. Solid particles of the sludge cannot settle within these zones and, hence, the sludge cannot collect due to the fact that, first, the clear opening of two said chambers at the height of the chlorine inlet means 6 is adopted to be the same as in the embodiment of the apparatus decribed hereinabove and is not more than 0.3 times the clear opening $F_2$ of the interior 2 at the height of the melt inlet and outlet means 7 and 8, and second, the height of the wedge-shaped partition 13 tapering upward exceeds the distance from the bottom 4 to the chlorine inlet means 6 by a factor of at least two.

The partition 13 just of such a height allowed to intensify the melt chlorination process in the volume of each chamber 14 because each of the said chambers 14 is separately provided with the chlorine inlet means 6.

The criterium selected by the applicants for determination of the height of the partition 13 is the chlorine speed that is adequate to produce a circulation in the lower portion of the interior 2 as the chlorine is supplied by said means 6.

On the basis of said criterium any further reduction in the height of the partition 13 below the minimum height found by the applicants would lead to a reduction in the contact surface of the chlorine and the melt and to a formation of stagnation (dead) zones in the lower portion of the interior 2 of the shell 1.

The division of the interior 2 of the apparatus by said partition into smaller communicating chambers 14, each provided with a chlorine inlet device 6 individually, made the construction of the chlorination apparatus useful and profitable for utilization in high-capacity apparatus.

In accordance with the invention, the number of the wedge-shaped partitions 13 tapering upward can be increased depending upon the capacity of the apparatus.

Figure 3:
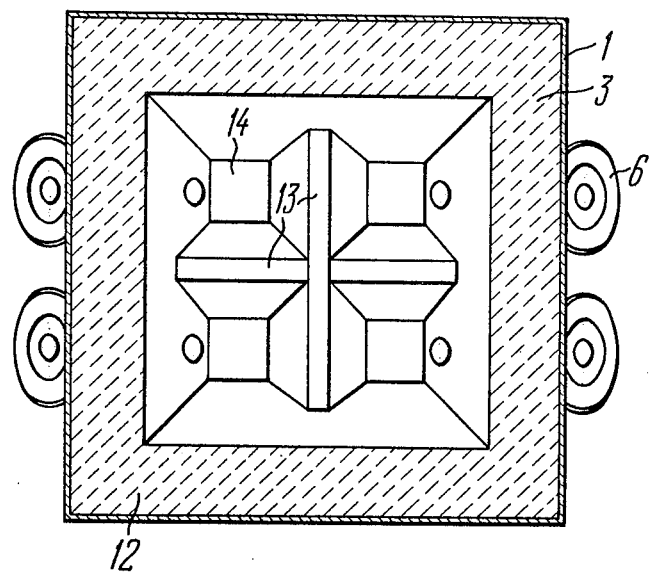
FIG. 3 is a top sectional view of still another embodiment of the apparatus comprising two intersecting partitions.

FIG. 3 illustrates still another embodiment of the invention and shows an apparatus provided with two mutually intersecting partitions 13 similar to that described hereinabove which are installed so that one is arranged along the longitudinal axis of the apparatus, whereas the other is disposed along the transverse axis, the chlorine inlet means 6 being located in the walls 3 of the shell 1 on both sides of one of the partitions 13. In this embodiment, formed in the lower portion of the interior 2 are four chambers 14 tapering downward and communicating with each other, each individually provided with the chlorine inlet means 6.

The clear opening of said four chambers at the level of the chlorine inlet means 6 is adopted to be not over 0.3 times the clear opening of the interior 2 of the shell 1 at the height of the melt inlet and outlet means 7 and 8 as for the embodiments described hereinabove.

The height of the partitions 13 exceeds the distance from the bottom 4 to the chlorine inlet devices 6 by a factor of at least two, as for the previous embodiment.

Figure 2:
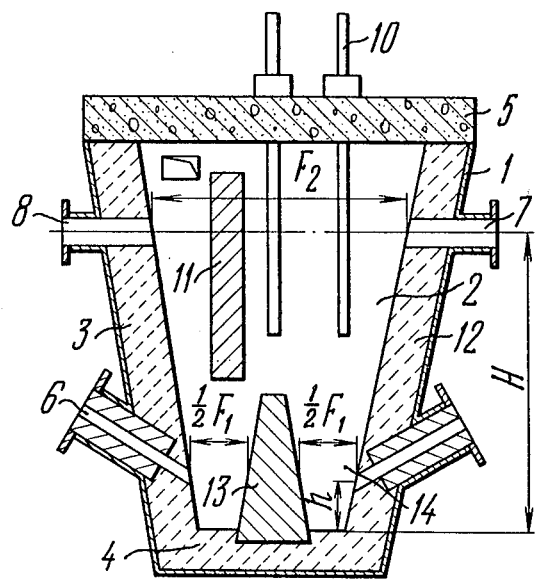
FIG. 2 is a vertical sectional view of another embodiment of the apparatus comprising a tapering upward partition mounted in the bottom.

The apparatus of FIG. 3 is an apparatus of a larger capacity than those shown in FIGS. 1 and 2 featuring a simple construction and a convenient operation.

In all embodiments discussed, the distance (h) from the bottom 4 to the chlorine inlet means 6 is less than 0.1 times the distance (H) from the bottom to the melt inlet and outlet means 7 and 8.

The chlorine inlet means 6 being installed at such a height, contribute to a reduction in the chlorine flow rate with a higher assimilation factor thereof and a lower specific flow rate. Accumulation of the sludge on the bottom is prevented by installation of the chlorine inlet means 6 at a distance from the bottom 4 not exceeding said value.

The proposed apparatus for chlorination of molten magnesium chloride salts operates as follows.

The electrodes 10 are connected to a current source. The interior 2 of the shell 1 is filled with molten magnesium chloride salts through the melt feed inlet means 7. A carbonaceous material, for example coke, that is fed with the melt is vigorously mixed within the melt and involved into the chlorination process.

At the same time chlorine is supplied into the lower portion of the interior 2 through the chlorine inlet means 6 at a pressure exceeding the pressure of the melt column.

It has been determined experimentally that the chlorine supplied under pressure into the lower portion of the apparatus facilitates intensive stirring and chlorination of solid particles. In the lower tapering portion of the interior 2 of the shell 1, circulation of the chlorine and the melt is produced, and the stirred flow is carried by the chlorine upwards whereas the melt flow lowers along the walls 3 of the shell 1 downwards.

Chlorination of molten salts takes place through the entire volume of the shell 1 of the apparatus without formation of stagnation zones and without sludge settling due to the particular ratio of clear openings of the interior 2 of the shell.

The chlorine supplied into the interior 2 under pressure prevents settling of solid particles on the bottom of the apparatus. As a result, they are chlorinated or flow out through the chlorinated melt outlet means 8 into the sediment chamber together with the melt. Gaseous products are drawn off through the opening 9 into a ventilation system.

The other embodiments of the apparatus disclosed hereinabove operate in a similar manner. The difference is that the chlorination process described goes on in every one of the chambers.

As a result of the chlorination process the composition of the melt becomes so uniform that, for example, the content of magnesium oxide is reduced from 2-3% down to 0.4-1%.

Thus, the selected ratio of clear openings $F_2$ and $F_1$ of the interior 2 increases the speed of the chlorine and melt circulation not only in the vicinity of the chlorine inlet means 6, but also through the entire apparatus volume, and this, in turn, prevents sludge collection on the bottom 4 and eliminates the labour-consuming operation of forced sludge removal from the apparatus, thus increasing the time of its continuous operation.

The advantages of the apparatus having the claimed construction are:

an increase in the production rate on average by 20 to 30%;

elimination of the labour-consuming operation of forced removal of the sludge from the apparatus;

1.5-2 fold increase in the continuous-operation time under aggressive media conditions;

considerable increase (1.2-2 times) in the apparatus capacity;

a simplified apparatus construction;

a simplified apparatus operation.

Apparatus elements are simple in manufacture while the apparatus construction is convenient for assembling and operation.

What is claimed is:

1. An apparatus for chlorination of molten magnesium chloride salts and the like, comprising a shell lined with a refractory material and having walls, a bottom and a cover, said walls, said bottom and said cover forming an interior of said shell, said interior being devoid of gas distribution grate means;

melt feed inlet means for feeding the melt into said shell interior, said melt feed inlet means being mounted in the upper portion of one of said walls;

chlorinated melt outlet means for removing the chlorinated melt from said shell interior, said chlorinated melt outlet means being mounted in the upper portion of another of said walls;

chlorine inlet means mounted in the lower portion of said walls, and wherein said shell interior being tapered downwardly so that the clear opening at the height of said chlorine inlet means is not over 0.3 times the clear opening at the height of said melt feed inlet means and said melt outlet means, said shell interior further accommodating at least one partition mounted in said bottom, tapering upward and dividing said shell interior into chambers intercommunicating only at their tops, said chlorine inlet means being mounted in said walls on both sides of said partition, and wherein said partition has a height exceeding the distance from said bottom to said chlorine inlet means by a factor of at least two, whereby by virtue of said tapered construction wherein the clear opening of the interior at the height of said chlorine inlet means is not over 0.3 times the clear opening at the height of said melt feed inlet means and said melt outlet means, said apparatus has a larger capacity than can be reliably obtained in apparatus which include gas distribution grate means.

2. An apparatus as defined in claim 1, wherein the distance from said bottom to said chlorine inlet means is less than 0.1 times the distance from said bottom to said melt feed inlet means and said chlorinated melt outlet means.

* * * * *